Patented Dec. 26, 1950

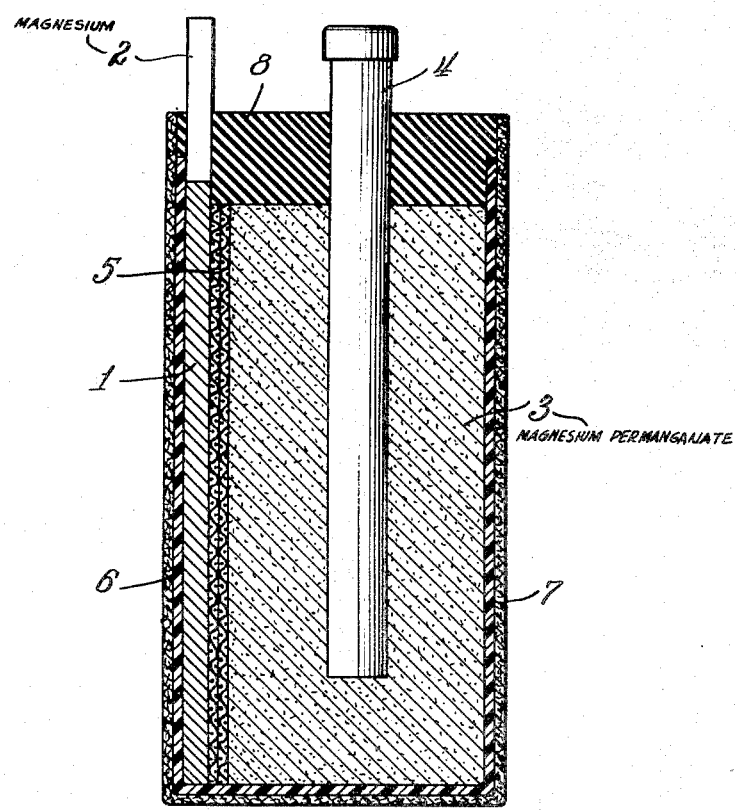

2,535,742

UNITED STATES PATENT OFFICE 2,535,742

PRIMARY CELL WITH ELECTRODES OF MAGNESIUM AND MAGNESIUM PERMANGANATE

Demetrios V. Louzos, Freeport, Ill., assignor, by mesne assignments, to Burgess Battery Company, Freeport, Ill., a corporation of Delaware Application February 18, 1948, Serial No. 9,313

14 Claims. (Cl. 136—100)

This invention relates to primary cells and more particularly to cells employing magnesium and a soluble permanganate as the electrochemical potential-producing system.

A principal object of the invention is to provide an improved and novel primary cell having a negative electrode of magnesium or an alloy thereof. A further object is to provide such a cell which is capable of delivering a strong electrical current over a sustained period with minimum voltage and current reduction due to polarization within the cell. A further object is to provide such a cell which has a higher open circuit potential than the commercial Leclanche cell and which is almost entirely inactive during storage and when the external circuit is open.

The invention is principally concerned with the electrochemical aspects of current generation without reference to particular cell structural details. The art already encompasses a wealth of structural arrangements for both wet and so-called "dry" primary cells which may be readily adapted to the use of the electrochemical elements employed in carrying out the invention. Accordingly, the invention is described herein with reference, by way of example, to its embodiments in a suitable dry cell unit.

Many attempts have heretofore been made to produce satisfactory voltaic cells employing magnesium as the negative electrode, but considerable difficulty has been encountered as a result of the relatively great chemical activity of this element which poses the problem of controlling its dissolution when exposed to contact by the electrolyte during periods of activity as well as inactivity of the cell. However, the inherent characteristics of the metal and its relative abundance offer many advantages as a cell element and a continuing challenge to the art to discover a commercially feasible magnesium cell.

The present invention employs magnesium, or an alloy thereof, as the negative electrode and the permanganate of magnesium as the positive electrode of the cell. As used herein, the term "magnesium alloy" means an alloy which is composed of at least 90% magnesium. Examples of such alloys and their approximate compositions, expressed as per cent of total alloy weight, are as follows:

| Al | Mn | Zn | Si | Cu | Ni | Fe | Mg |
|---|---|---|---|---|---|---|---|
| 2.5-3.5 | 0.20 | 0.7-1.3 | 0.3 | 0.05 | 0.005 | 0.005 | Remainder. |
| 5.8-7.2 | 0.15 | 0.4-1.5 | 0.3 | 0.05 | 0.005 | 0.005 | Do. |
|  |  | 1.20 |  | 0.3 | 0.05 | 0.1 |  | Do. |

In the accompanying drawing, which illustrates, in section, a dry cell exemplification of the invention, the negative electrode is shown as a plate 1 having a tab 2 projecting from the cell unit as an external terminal. This electrode may be composed of magnesium or a magnesium alloy. The positive electrode of the permanganate of magnesium, lithium, sodium, or potassium is provided by incorporating it as an ingredient of core 3. This core comprises a compressed mixture of the powdered solid permanganate and a suitable finely divided carbonaceous material, such as an acetylene or other carbon black, pulverized graphite, or the like, all moistened with water. As an example, a suitable core may be conveniently prepared by mixing powdered potassium permanganate with thermal acetylene black and a saturated aqueous solution of potassium permanganate in approximately the following proportions, by weight:

|  | Per cent |
|---|---|
| Powdered potassium permanganate | 65 |
| Thermal acetylene black | 7 |
| Potassium permanganate solution | 28 |

Core 3 may be tamped around a terminal 4 of carbon or other suitable inert conductive material either before or after insertion in the cell or the terminal may be inserted after the core block has been formed. A separator 5 of a suitable inert bibulous non-conductive material is inserted between the negative electrode 1 and core 3. The requisite characteristics of separator 5, in addition to being electrically non-conductive, include permeability to the permanganate electrolyte solution and resistance to oxidation by this powerful oxidizing agent. Glass cloth is an example of a suitable material for this use.

The assembly of cell elements thus described is enclosed within a suitable moisture-proof container 6 of a film material which is inert to the permanganate solution. A polyethylene may be used as a suitable film material. An outer container 7 of wax or resin impregnated cardboard supports and protects the cell and a seal 8 of wax or other plastic sealing material closes the cell. The sealing material used for this purpose must, of course, be inert to the permanganate solution.

Within a short period of time following assembly of the cell, the permanganate solution will have migrated from the core to wet the surface of the negative electrode. This solution serves as the electrolyte to electrically connect the negative electrode with the positive electrode of permanganate. Although the metallic electrode is corroded to only a limited extent when the external circuit is open, electrochemical activity commensurate with the current drain is initiated by the closing of an external circuit. During this activity, the permanganate electrolyte solution is kept saturated by contact with the solid permanganate material in the core.

The initial voltage of a cell such as that described and having a magnesium negative electrode and a positive electrode and electrolyte solution of potassium permanganate is approximately 2.2 volts. A theoretical comparison of the electrochemical system herein described with that of the ordinary zinc-manganese dioxide Leclanche cell indicates that the capacities are approximately equal. In a neutral or basic media; e. g., potassium permanganate solution, the hydrogen equivalent of potassium permanganate in electrochemical reduction to manganese dioxide is 0.052 per cubic centimeter whereas the hydrogen equivalent of manganese dioxide reduced to manganic oxide in the Leclanche cell is 0.058 per cubic centimeter. Although more complicated products may actually be formed in the operation of the cell, for purposes of description and explanation the reduction equations may be expressed as follows:

Permanganate cell:

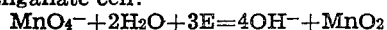
$MnO_4^- + 2H_2O + 3E = 4OH^- + MnO_2$

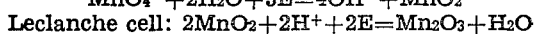
Leclanche cell: $2MnO_2 + 2H^+ + 2E = Mn_2O_3 + H_2O$

The capacities of the cells employing the magnesium-permanganate system are substantially increased by the addition of a small amount of an electrolyte salt as a supplement to the permanganate in the electrolyte solution. Sodium chloride is effective for this purpose and the chloride of potassium, magnesium, and lithium may be used. Other readily soluble compounds may be used. By way of example, a quantity of sodium chloride equal to approximately 5% of the weight of the permanganate solution may be added to the permanganate solution in preparing the electrolyte. The proportion of salt added to the permanganate solution is not critical. In general, less than 10% of the weight of the permanganate solution will be required.

While the addition of the supplementary electrolyte salts to the electrolyte have the desired effect of increasing the electrical capacities of the cells, the shelf life may be reduced by their presence. Accordingly, the use or non-use of such salts will depend upon the particular intended application and desired operating characteristics of the cell. Similarly, the choice of alloy and selection of the particular permanganate to be used depend upon what performance characteristics are desired. A mixture of any or all of the permanganates of magnesium, lithium, sodium, and potassium may be used in the cell if, for any reason, such a mixture is desired.

Invention is claimed as follows:

1. In a primary cell, a negative electrode of a metal consisting of at least 90% magnesium in combination with a positive electrode of magnesium permanganate.

2. In a primary cell, in combination, a negative electrode of a metal consisting of a least 90% magnesium, a positive electrode, and an electrolyte comprising an aqueous solution of the permanganate of magnesium.

3. The combination of claim 2 in which the positive electrode comprises the permanganate of magnesium.

4. The combination of claim 3 and including in the electrolyte a quantity of an electrolyte salt equal to from a trace to 10% of the weight of said aqueous solution whereby to increase the electrical capacity of the cell.

5. The combination of claim 3 and including in the electrolyte a quantity of sodium chloride equal to approximately 5% of the weight of said aqueous solution.

6. In a primary cell, in combination, a negative electrode of magnesium, a positive electrode of magnesium permanganate, and an electrolyte comprising a saturated aqueous solution of magnesium permanganate.

7. In a primary cell, in combination, a negative electrode of a magnesium base alloy containing from 5.8% to 7.2% of aluminum, a positive electrode of magnesium permanganate, and an electrolyte comprising a saturated aqueous solution of magnesium permanganate.

8. The combination of claim 7 and including in the electrolyte a quantity of sodium chloride equal to approximately 5% of the weight of said aqueous solution.

9. A primary cell comprising a negative electrode of a metal consisting of at least 90% magnesium, a positive electrode comprising the permanganate of magnesium, an electrolyte comprising a saturated solution of said permanganate, and a carbon terminal in contact with said positive electrode.

10. In a dry cell, a positive electrode comprising the permanganate of magnesium in solid form.

11. A dry cell comprising a negative electrode of a metal consisting of at least 90% magnesium, a positive electrode comprising solid magnesium permanganate, and an electrolyte comprising a saturated aqueous solution of magnesium permanganate.

12. A dry cell comprising a negative electrode of a metal consisting of at least 90% magnesium, a positive electrode comprising solid magnesium permanganate, and an electrolyte comprising a saturated aqueous solution of magnesium permanganate and a quantity of sodium chloride equal to approximately 5% of the weight of said aqueous solution.

13. A dry cell comprising a negative electrode of magnesium forming one terminal of said cell; a terminal of carbon; a core surrounding said carbon terminal and in intimate contact therewith; said core comprising a mixture of the powdered permanganate of magnesium, a finely divided carbonaceous material, and a saturated aqueous solution of said permanganate; and a bibulous separator of glass cloth between said core and said negative electrode.

14. A dry cell in accordance with claim 13 and including a container of a polyethylene film.

DEMETRIOS V. LOUZOS.

REFERENCES CITED

The following references are of record in the file of this patent:

UNITED STATES PATENTS

| Number | Name | Date |
|---|---|---|
| 1,228,359 | Ellis | May 29, 1917 |
| 1,232,873 | Wells | July 10, 1917 |
| 1,232,904 | Ellis | July 10, 1917 |
| 1,899,616 | Heise | Feb. 28, 1933 |
| 2,463,316 | Ruben | Mar. 1, 1949 |

FOREIGN PATENTS

| Number | Country | Date |
|---|---|---|
| 9,594 | Great Britain | 1886 |
| 163,744 | Great Britain | May 30, 1921 |